UNITED STATES PATENT OFFICE.

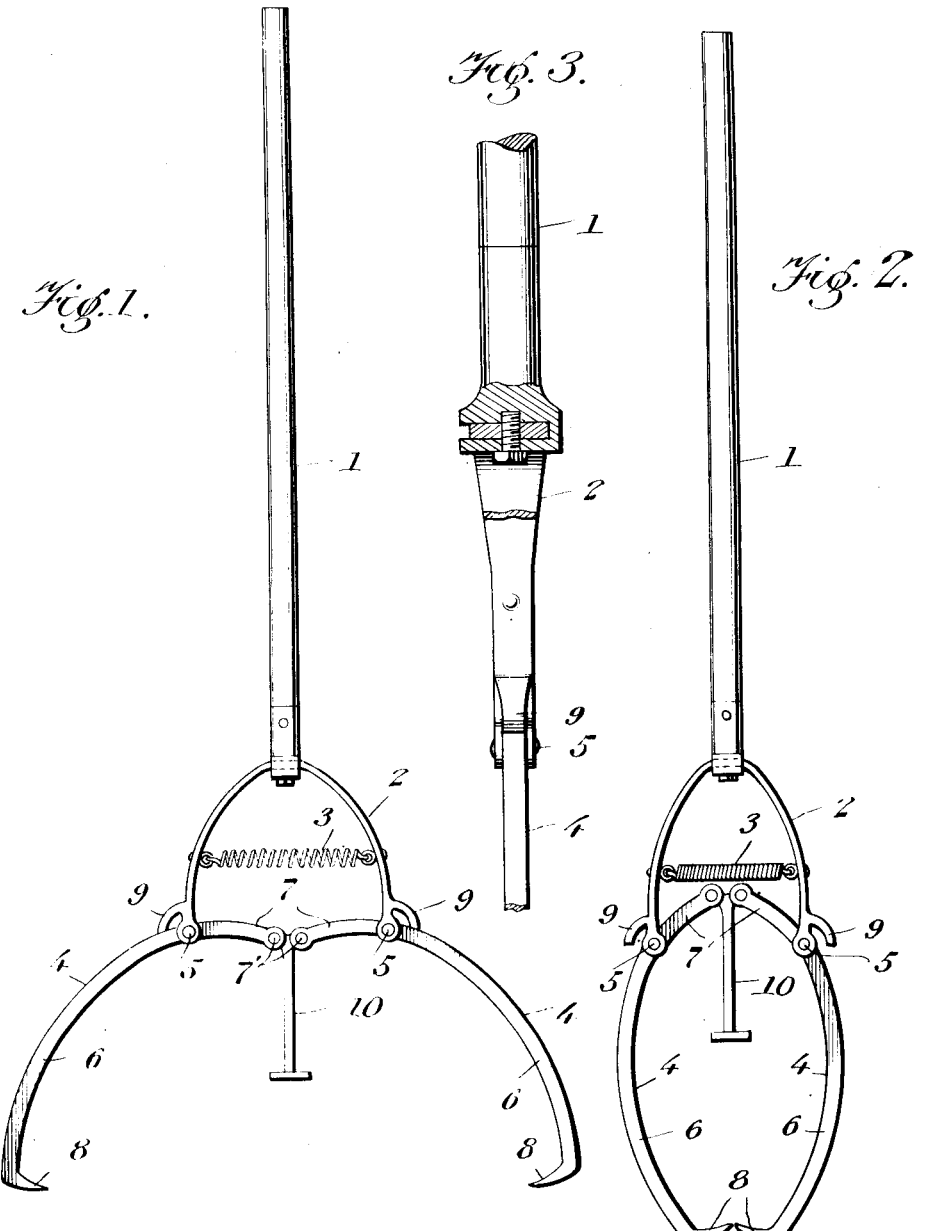

FRANK D. KRATOCHWILL, OF BOSCOBEL, WISCONSIN.

FISH-SPEAR.

1,110,213.  Specification of Letters Patent.  Patented Sept. 8, 1914.

Application filed June 10, 1913. Serial No. 772,810.

*To all whom it may concern:*

Be it known that I, FRANK D. KRATOCHWILL, a citizen of the United States, residing at Boscobel, in the county of Grant and State of Wisconsin, have invented new and useful Improvements in Fish-Spears, of which the following is a specification.

This invention relates to fish spears, the object of the invention being to provide a device of this character which is simple of construction, reliable and efficient in action, and which will not mutilate the flesh of the fish when speared to an objectionable extent.

A further object of the invention is to provide a device of the character described which embodies means for normally holding the jaws distended or spread, and for closing the jaws, when the device comes in contact with the body of a fish, in a rapid manner, thus insuring certainty of action in making the catch.

The invention consists of the features of construction, combination and arrangement of parts hereinafter fully described and claimed, reference being had to the accompanying drawing, in which:—

Figure 1 is a view of the device as set or distended ready for use. Fig. 2 is a view of the device with the jaws closed. Fig. 3 is a side elevation of the device, partially broken away and in section.

Referring to the drawing, 1 designates the handle of the device, which carries at one end a fork or yoke 2, made of spring wire or other suitable spring material, and the arms of which are connected by a coiled contractile spring 3.

Pivoted to the ends of the forked arms are curved jaws or tines 4, the pivot points 5 being disposed between the center and inner ends of the jaws, thus forming long arms 6 and short arms 7, the free ends of the said long arms being provided with inwardly extending spurs 8. Stops 9 are provided upon the fork arms adjacent the pivots to limit the outward swinging or spreading motion of the jaws 4. The long arms 6 of the jaws are adapted, when opened, to abut against segmental stop lugs 9 integral with the forward ends of the arms of the fork 2 and terminating about in a line with or slightly in rear of the centers of the pivots 5, whereby the opening movement of said jaws is limited and in such opening movement of the jaws the arms of the fork are spread apart and the spring 3 placed under tension. The inner ends of the short arms 7 of the jaws are pivotally connected, as at 7', with the inner end of a forwardly extending trigger rod and setting device 10, the construction and arrangement being such that a forward pull upon said rod will simultaneously open both jaws, while a rearward movement of said rod will affect the simultaneous closing of both jaws.

It will be understood that when the jaws are spread open to their full extent and engage with the stops 9, the arms of the fork 2 will be spread therewith and the spring 3 extended, while the inner ends of the short arms 7 of the jaws will be moved to a lock-joint position in advance of the pivots 5 and will hold the long arms 6 of the jaws outwardly beyond center, thus preventing them from closing. When, however, in the manipulation of the spear, the trigger rod 10 comes in contact with the body of a fish, the said trigger rod is forced inwardly and transfers inward motion to the short arms 7 of the jaws, thus bringing the long arms thereof forwardly to a position beyond center, where the spring action of the fork and contractile energy of the spring 3 will rapidly force the jaws to a closed position, thus impaling the fish. It will be apparent that the device may be easily set and will be rapid in action, and that as the spurs 8 only are used as penetrating objects, the fish will not be torn or mutilated to an undesirable extent.

I claim:—

1. A fish spear comprising a handle, a bowed spring fork carried by the handle, a pair of curved impaling jaws having long and short arms, the long arms of said jaws being provided with impaling points at their outer ends and said jaws being pivoted at the points of intersection of their arms to the ends of the fork, a coiled spring connecting the arms of the fork, a forwardly projecting trigger rod pivoted to the inner ends of the short arms of the jaws, and stop lugs upon the ends of the fork for limiting the opening movement of the jaws and for spreading the fork arms whereby the spring is placed under tension, the construction being such that when the jaws are opened the inner ends of the short arms of the jaws will lie in advance of the pivotal connections between the jaws and fork arms.

2. A fish spear comprising a handle, a fork carried by the handle, said fork being of bowed formation and made of spring metal, a pair of curved impaling jaws having long and short arms, the long arms of said jaws being provided with impaling points at their outer ends and said jaws being pivoted at the points of intersection of their arms to the ends of the spring fork, a coiled spring connecting the ends of the spring fork, a coiled spring connecting the arms of the fork, a forwardly projecting trigger rod pivoted to the inner ends of the short arms of the jaws, and outwardly and forwardly curved stop lugs upon the ends of the fork, in rear of the pivots of the jaws and extending forwardly on arcs eccentric to said pivots so as to be in the paths of opening movement of the jaws, said lugs serving as stops to limit the opening movement of the jaws and also as connections for transmitting pressure from the jaws to the fork arms when the jaws are opened to spread said fork arms, whereby the coiled spring is placed under tension, the construction being such that when the jaws are open the inner ends of the short arms of the jaws will lie in advance of the pivotal connections between the jaws and fork arms.

In testimony whereof I affix my signature in presence of two witnesses.

FRANK D. KRATOCHWILL.

Witnesses:
JOHN D. SEMRAD,
JACOB MILLER.